B. F. Tuttle,
Stump Elevator.
N°42,809.                 Patented May 17, 1864.
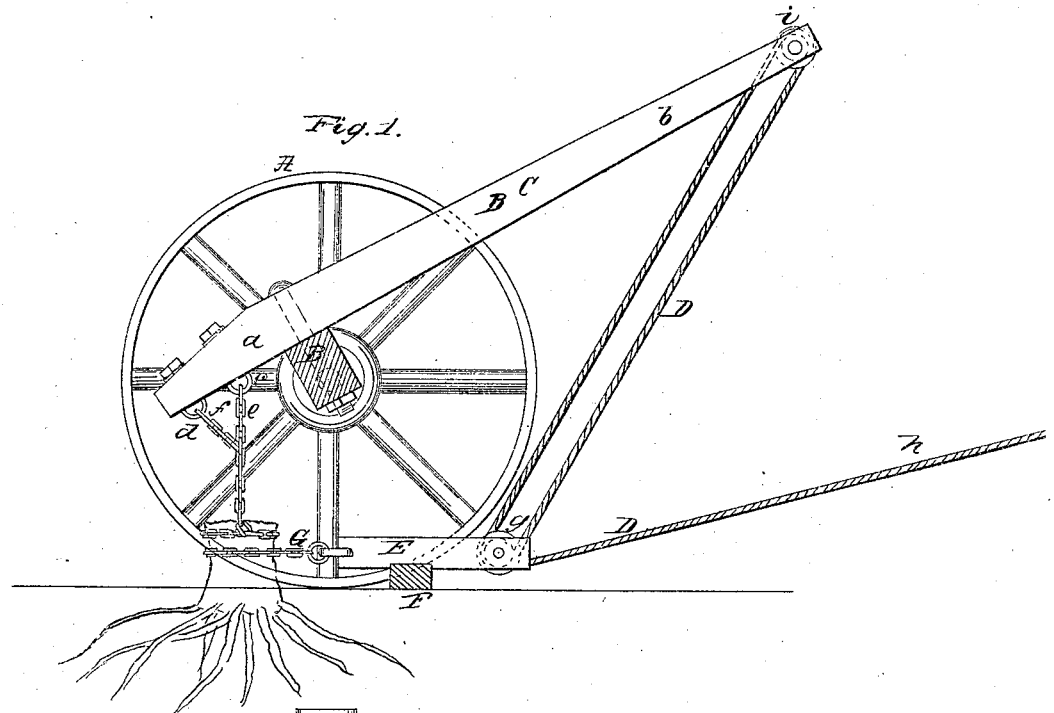
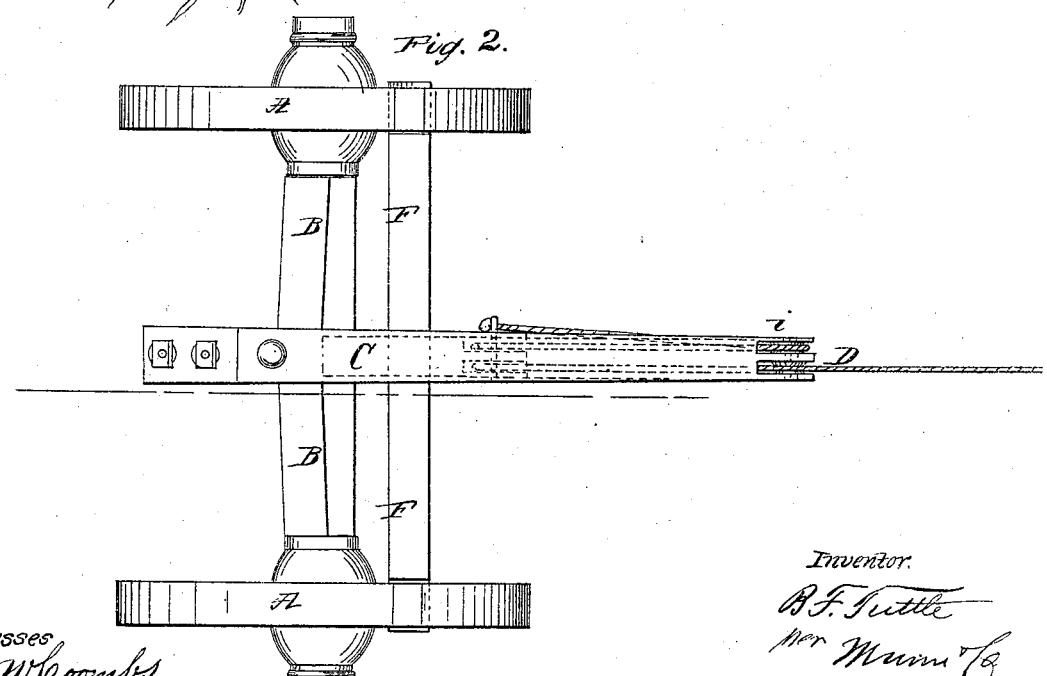
Witnesses
J. W. Coombs
G. W. Reed
Inventor.
B. F. Tuttle
per Munn & Co
Atty.

UNITED STATES PATENT OFFICE.

B. F. TUTTLE, OF CHELSEA, MICHIGAN.

IMPROVEMENT IN STUMP-EXTRACTORS.

Specification forming part of Letters Patent No. 42,809, dated May 17, 1864.

*To all whom it may concern:*

Be it known that I, B. F. TUTTLE, of Chelsea, in the county of Washtenaw and State of Michigan, have invented a new and useful Improvement in Stump-Extractors; and I do hereby declare that the following is a full, clear, and exact description thereof, which will enable any person skilled in the art to make and use the same, reference being had to the accompanying drawings, forming a part of this specification, in which—

Figure 1 is a side sectional elevation; Fig. 2, a plan view.

Similar letters of reference indicate the same parts.

A A are heavy wheels, arranged one at each end of a strong axle, B, which forms the fulcrum or support for a lifting-lever, C, the short arm of which $a$ projects rearward beyond fulcrum B, while the long arm $b$ projects in front of the fulcrum, as shown in the drawings. The lever C is attached to the axle B by means of bolts, or in any other suitable manner. Upon the short arm of the lever C there are fixed two strong staples, $c\ d$, and a chain, $e$, passes from staple $c$ to the stump, while another shorter chain, $f$, passes from the staple $d$ and unites with chain $e$ near its middle.

Secured in the extremity of the long arm $b$ of lever C are a set of pulleys, $i$, around which passes a drawing rope or cable, D, which also passes around the pulleys $g$, in the extremity of a cross-bar, E, which is attached to a brake-bar, F, employed, as will shortly appear, to brace and block the wheels A. The rope and pulleys are arranged to form a compound pulley of the well-known kind, which may be increased or diminished in power as desired, and the force to operate the pulley is applied at the extremity of the rope at $h$. And manual or horse power may be employed as most convenient.

The rear extremity of the bar E is attached by a chain, G, to the stump. The extremities of the brake-bar F are slightly beveled, so that they will fit well under the wheels A.

When the machine is attached to a stump ready for pulling its several parts stand in the position shown in Fig. 1.

Power being applied at $h$ to draw upon the rope, the compound pulley acts to pull down the long arm of the lever C, and raise the short arm thereof, and with it the attached stump.

The bar E is maintained in a horizontal position by means of the brake-bar F, which is kept down by the resting upon it of the wheels A, and the brake-bar F also braces the wheels and keeps them in one position while the stump is being raised. The bar E is prevented from being drawn forward out of place by the chain G, which is attached to the stump.

When the short arm $a$ of the lever C begins to rise the strain falls in a direct line upon chain $e$; but after the long arm of the lever has passed below the center of the fulcrum the strain falls upon the chain $f$.

The combination of parts here shown forms a very effective and easily-constructed machine, which may be used to raise stumps or anything requiring great power, and the machine may be transferred from one locality to another with about as much facility as a common cart, as all the parts may be carried upon the wheels and axle, to which the lever C will form a tongue.

Having thus described my invention, I claim as new and desire to secure by Letters Patent—

The combination of the brake-bar F, cross-bar E, and compound pulley, with the lever C, axle-fulcrum B, and wheels A, all in the manner and for the purpose herein shown and described.

B. F. TUTTLE.

Witnesses:
  H. A. SMITH,
  A. R. FENN.